(No Model.)

J. P. SERVE.
GROOVED PULLEY.

No. 574,580. Patented Jan. 5, 1897.

Witnesses
W. A. Kennedy
F. S. Elmore

Inventor
J. P. Serve
P. T. Dodge
Atty.

UNITED STATES PATENT OFFICE.

JEAN PIERRE SERVE, OF LYONS, FRANCE.

GROOVED PULLEY.

SPECIFICATION forming part of Letters Patent No. 574,580, dated January 5, 1897.

Application filed October 9, 1895. Serial No. 565,148. (No model.) Patented in France March 15, 1892, No. 220,144.

*To all whom it may concern:*

Be it known that I, JEAN PIERRE SERVE, engineer, a citizen of the Republic of France, residing at 17 Quai de Cuire, Lyons, in the Republic of France, have invented certain new and useful Improvements in Grooved Pulleys for Transmitting Power by Cables or for other like Purposes, (patented in France March 15, 1892, No. 220,144,) of which the following is a specification.

This invention relates to improvements in grooved pulleys for cable or other like transmission of power.

It has for its object to afford efficacious means for preventing the cable from slipping in the groove of the pulley under the strain of the traction to which it is subjected, and thus to avoid loss of power and wear and tear of the cable resulting from its slipping and from the stretching due to the excess of tension found necessary at present to prevent it from slipping.

The invention consists, essentially, in giving the pulley groove or grooves an undulated form and in arranging the interior faces of the groove in a special manner. These undulations may be more or less pronounced, according to the nature of the power to be transmitted. In this manner the cable is forced to bend alternately on two sides of its mean position, thus exerting against the projections and the undulations of the groove transverse strains, which insure its adherence and oppose any deleterious slipping.

The invention is shown in the accompanying drawings, in which—

Figure 1:
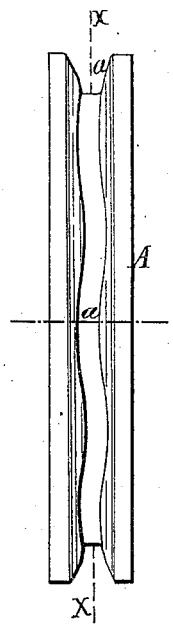
Figure 2:
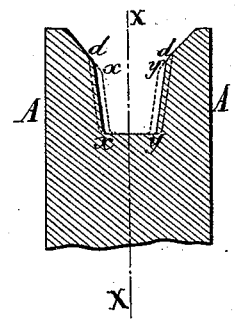

Figure 1 is a front elevation of a pulley with a single undulated groove. Fig. 2 is a transverse section, on a larger scale, of Fig. 1, showing the form of the groove.

As may be seen in Fig. 1, the periphery or rim A of the pulley is provided with a deep groove $a$, the walls of which are slightly inclined, with the object of more strongly gripping the cable $b$ and presenting alternately at each side of the central plane X X more or less numerous and more or less pronounced projections, which form a series of undulations which the cable is forced to follow when passed round the pulley, the effect of which is to hold the cable firmly in the groove $a$ and prevent it slipping under the action of the traction to which it is subjected.

In order that the cable coming in a straight line may not escape and that it may be obliged to bend laterally and penetrate completely into the undulations of the groove $a$, I take care to make this latter of sufficient depth and to round the edges, so as to form thus a sort of external circular groove in which the cable first engages and is guided, in order to afterward descend into the undulations which it has to pass around, and the inclined and equidistant faces of which are suitably adjusted to their circular prolongation. This arrangement is clearly shown in Fig. 2, in which $d\ d$ are the two circular parts of the grooves and $x\ x$ and $y\ y$ represent the two oblique faces of the undulated part in which the cable lodges. Finally, the dotted parallel lines indicate the extreme positions of these two faces $x\ x$, $y\ y$, which, according as they are more or less distant from the mean plane X X of the pulley, fit at different heights to the circular edges $d\ d$ of the grooves.

In order to make these pulleys having one or more undulated grooves, I employ revolving chisels acting on the cast-metal pulley, and which receives a given transverse movement by means of a templet. I can also form the pulleys of several similar parts provided laterally with projections and symmetrical hollows in such a way that by fixing these parts opposite one another, so that the projections of the one coincide with the hollows of the other, an undulated pulley, such as the one shown in Fig. 1, is obtained, the connecting-face of the two parts being again represented by the mean line X X of this figure. Any other suitable means may, however, be employed, such, for instance, as by applying to each side of the circular groove of a pulley packing of suitable form attached thereto by means of screws or in other suitable manner.

Finally, the undulated grooved pulleys which I have just described may, of course, not only be employed for transmitting movement by cables, but may also be employed with advantage in certain machines for operating tools or the like employed in industry.

It will be obvious that while I have shown and described my improved pulley as provided with but one groove I may, without departing from the limits or spirit of my invention, provide the same with a plurality of grooves of a form and arrangement exactly similar to that described above in detail, the number of grooves with which I provide a pulley depending upon the amount of power which it is desired to have the same transmit.

I declare that what I claim is—

The improved pulley provided in its peripheral face with an inner groove having continuous undulating side walls diverging outward and an outer groove forming a continuation of the inner groove and having side walls extending straight around the pulley and parallel to each other and diverging from the point where they join the walls of the inner groove, outward.

In testimony whereof I have signed my name to this specification in the presence of two subscribing witnesses.

JEAN PIERRE SERVE.

Witnesses:
JOSEPH MAUR DUMOULIN MINGUEL,
PIERRE ROUMIER.